Patented Feb. 17, 1953

2,628,951

UNITED STATES PATENT OFFICE 2,628,951

LIGHT STABLE POLYMERS STABILIZED WITH AMINE OXIDES

George C. Claver, Jr., South Hadley, Mass., assignor to Monsanto Chemical Company, St. Louis, Mo., a corporation of Delaware No Drawing. Application March 28, 1951,
Serial No. 218,086

4 Claims. (Cl. 260—45.9)

This invention relates to stabilized polymeric aromatic vinyl compounds and to a new class of stabilizers therefor.

Polymers of aromatic compounds having ethylenic unsaturation in a side chain are for the most part brilliantly clear resinous materials. They are particularly useful in ornamental applications both because of the brilliance and because they can be readily colored in all the hues of the rainbow. Unfortunately, the polymers have a tendency to darken and develop a yellow to brown discoloration on extended exposure to sunlight. This discoloration spoils the pristine beauty of the molded objects and greatly reduces the marketability of the resin.

One object of this invention is to provide polymeric vinyl aromatic compounds which are exceptionally resistant to the deleterious effect of direct sunlight.

A further object is to provide new light stabilizers for polymeric vinyl aromatic compounds.

These and other objects are attained by incorporating into the polymeric material a stabilizing amount of an amine oxide.

The following examples are given in illustration and are not intended as limitations on the scope of this invention. Where parts are mentioned, they are parts by weight.

Example I

Styrene is polymerized in a mass polymerization process to provide a polymer having an average molecular weight of about 60,000. One hundred parts of the polymer are milled with 0.01 part of diethyl ethanol amine oxide on hot milling rolls until the amine oxide is thoroughly dispersed throughout the polymer. The polymer is then comminuted and injection molded. The molded pieces are subjected to ultraviolet radiation from a General Electric S-1 sunlamp and are free from discoloration after 200 hours exposure. Another portion of the same polymer is milled for the same time under identical conditions without the addition of the amine oxide. The milled polymer is comminuted, injection molded and the molded piece exposed to the same sunlamp. Within 24 hours the unmodified sample shows traces of yellowness and within 50 hours the piece is quite yellow.

Example II

One hundred parts of the same styrene polymer of Example I are dissolved in toluene and 0.01 part of diethyl ethanol amine oxide is stirred into the solution. A 0.001 film is prepared by casting the solution on a glass plate and allowing the solvent to evaporate. When subjected to ultraviolet radiation, the film shows substantially no discoloration after 200 hours. A film prepared from the same polymer in the same manner but omitting the amine oxide, discolors within 40 hours under ultraviolet radiation.

When the experiments of Examples I and II are repeated substituting polymers of alpha methyl styrene, and various mono and polychlorostyrenes for the styrene polymer, substantially the same results are obtained.

Example III

For this example, a granular polystyrene having a molecular weight of about 65,000 is used. A solution of 0.01 part of triethylamine oxide in water is added gradually to 100 parts of the granular resin in a tumbling barrel. Tumbling action is continued until the solution and granular particles are thoroughly intermixed. Then the solvent is removed by evaporation, leaving a dry granular powder coated with the amine oxide. The coated powder is fabricated by both injection molding and extrusion methods. The fabricated articles are then exposed to ultraviolet radiation for 100 hours. No discoloration can be detected even after such extended exposure.

The stabilizers of this invention are oxides of tertiary amines in which the substituents on the nitrogen atom may be alkyl, alkylol, aralkyl, aryl, acyclic or a combination of two or more of these groups. They are derived from tertiary amines and a peroxide, preferably hydrogen peroxide. The amine oxides are stable compounds and appear to have specific action on aromatic compounds having ethylenic unsaturation in a side chain. Examples of the different types of amine oxides which are operative are trialkyl amine oxides such as trimethyl, triethyl, tributyl, trioctyl, etc., amine oxides, trialkylol amine oxides such as triethanolamine oxide, mixed alkyl alkylol amine oxides such as diethyl ethanol amine oxide, triaryl amine oxides such as triphenyl amine oxide, mixed alkyl aryl amine oxides such as dimethyl aniline oxide, triaralkyl amine oxides such as tribenzyl amine oxide and heterocyclic amine oxides such as pyridine oxide, quinoline oxide, etc. The amount of amine oxide which may be used varies from 0.001 to 0.1 part per 100 parts of resin.

The amine oxides may be used to stabilize polymers of aromatic compounds containing ethylenic unsaturation in a side chain. Of prime importance are the polymers of styrene, alpha methyl styrene, ring methylated styrenes and ring chlorinated styrenes and copolymers of these compounds. The amine oxides are also stabilizers for copolymers of the above named compounds with other ethylenically unsaturated compounds provided that the aromatic compound constitutes at least 50% by weight of the polymer.

The amine oxides may be incorporated into the polymer in any convenient manner. They may be blended with the particulate polymer either with or without and added solvent and then the blend may be homogenized by milling, extrusion, injection molding, etc. The only necessary precaution is to insure that the amine oxide is thoroughly distributed throughout the polymer in the final article.

It is obvious that variations may be made in the products and processes of this invention without departing from the spirit and scope thereof as defined in the appended claims.

What is claimed is:

1. A light-stable composition comprising 100 parts of a polymer of an aromatic compound containing ethylenic unsaturation in a side chain and from 0.001 to 0.1 part of an amine oxide.

2. A light-stable composition comprising 100 parts of a polymer of styrene and from 0.001 to 0.1 part of an amine oxide.

3. A light-stable composition comprising 100 parts of a polymer of styrene and from 0.001 to 0.1 part of diethyl ethanol amine oxide.

4. A light-stable composition comprising 100 parts of a polymer of styrene and from 0.001 to 0.1 part of triethylamine oxide.

GEORGE C. CLAVER, Jr.

REFERENCES CITED

The following references are of record in the file of this patent:

UNITED STATES PATENTS

| Number | Name | Date |
|---|---|---|
| 2,287,188 | Matheson et al. | June 23, 1942 |